United States Patent Office 3,265,762
Patented August 9, 1966

3,265,762
SEGMENTED LINEAR COPOLYESTERS OF 2,5-DI-
SUBSTITUTED TEREPHTHALIC ACIDS
Richard Keith Quisenberry, Kinston, N.C., assignor to
E. I. du Pont de Nemours and Company, Wilmington,
Del., a corporation of Delaware
No Drawing. Filed Oct. 24, 1962, Ser. No. 232,876
6 Claims. (Cl. 260—860)

This invention relates to linear condensation copolyesters, and more particularly to novel segmented copolyesters which exhibit good dyeability and which are resistant to alkaline hydrolysis.

In recent years synthetic linear condensation polyesters have achieved wide commercial acceptance for use in fibers, films, and other shaped articles, owing to their high tensile strength and other desirable properties. Fabrics produced from fibers of the synthetic linear condensation polyesters have been noted for their adaptability for "ease-of-care" garments requiring only occasional touch-up ironing. Considerable effort has been expended toward improving the properties of the polyesters still further, and particularly towards improving their dyeability, since as a class the polyesters dye much less readily than do the natural fibers. It has been observed that copolyesters dye more readily than the corresponding homopolyesters. Unfortunately, however, copolyesters tested up to the present time have generally also exhibited lower melting points as well as poorer tensile properties and other properties.

An object of this invention, therefore, is to provide novel synthetic linear condensation copolyesters of improved properties, suitable for shaping into filaments and films. Another object is to provide filaments and films of such copolyesters which exhibit good dyeability, superior resistance to alkaline hydrolysis, and other desirable properties. Other objects will appear as the description of the invention proceeds.

It has now been found that the desired properties are exhibited by a novel segmented linear copolyester having an inherent viscosity of at least about 0.3 and comprised of alternating first and second polyester-segments connected through ester linkages, said first polyester segment consisting essentially of a succession of 3 to about 200 recurring structural units of a glycol ester of a dicarboxylic acid represented by the following Formula I:

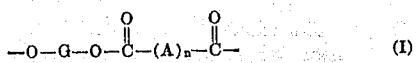

said second polyester segment being different from the first and consisting essentially of a succession of from 3 to about 200 recurring structural units of a glycol ester of a dicarboxylic acid represented by the following Formula II:

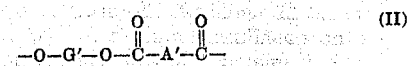

wherein G and G' are the same or different saturated hydrocarbon radicals containing from 2 to 20 carbon atoms; n is 0 or 1; A is a primarily hydrocarbon radical of 2 to 20 carbon atoms, free from aliphatic unsaturation, which may contain halogen or chalkogen as nonhydrocarbon components; and A' is a phenylene radical having its valence bonds separated by at least 3 carbon atoms in the ring and containing, ortho to each valence bond, a substituent selected from the class consisting of halogen radicals and hydrocarbon radicals containing from 1 to 8 carbon atoms; the over-all ratio by weight of the ester units of Formula I to the ester units of Formula II being in the range 60/40 to 95/5. Preferably, the ester of Formula II is a glycol ester of a 2,5-disubstituted terephthalic acid represented by the formula

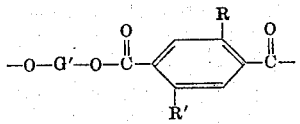

wherein G' is as defined above and R and R' are the same or different radicals from the class of halogen radicals and hydrocarbon radicals containing from 1 to 8 carbon atoms. It is also preferred that the ester units of Formula I contain at least one 6-membered carbocyclic ring in the ester chain to separate the adjacent carbonyloxy

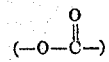

linkages in the ester unit by at least 4 ring carbon atoms.

In one embodiment of the invention, polyester "blocks" are prepared separately in accordance with conventional polycondensation procedures, followed by melt blending of the polymers thus formed, with subsequent additional polymerization of the melt blend if desired. In one reaction vessel, the glycol dicarboxylate polyester of Formula I is prepared. Suitable examples of glycols which may be employed include ethylene glycol, trimethylene glycol, tetramethylene glycol, decamethylene glycol, 1,2-propanediol, 3-methyl-1,5-pentanediol, 1,3-cyclobutanedimethanol, 1,4 - cyclohexane - β,β' - diethanol, 1,3-cyclopentanedimethanol, 1,4 - cyclohexane - dimethanol, decahydro - 2,6 - bis(hydroxymethyl)naphthalene, bis(4-hydroxymethylcyclohexyl), and 1,2 - bis(4 - hydroxymethylcyclohexyl)ethane. Suitable examples of dicarboxylic acids which may be employed include oxalic acid, succinic acid, adipic acid, azelaic acid, sebacic acid, terephthalic acid, 4,4'-bibenzoic acid, chlorotherephthalic acid, fluoroterephthalic acid, bromoterephthalic acid, iodoterephthalic acid, sulfonyl-4,4'-dibenzoic acid, 2,6-naphthalenedicarboxylic acid, 2,8-dibenzo-furandicarboxylic acid, decahydro - 2,6 - naphthalenedicarboxylic acid, 1,3 - cyclopentanedicarboxylic acid, bis(4 - carboxyphenyl)ether, bis(4 - carboxyphenyl)ketone, and stilbene-4,4'-dicarboxylic acid. A mixture of glycols or a mixture of acids may be employed, the term "polyesters" being intended to include copolyesters.

The glycol dicarboxylate polyester may be prepared directly from the dicarboxylic acid, or an ester-forming derivative of the dicarboxylic acid may be used, i.e., an acid halide, a salt, its anhydride, or an ester thereof, particularly an ester of the dicarboxylic acid with a lower aliphatic alcohol or with phenol. Correspondingly, an ester-forming derivative of the glycol may be employed, i.e., a derivative of the glycol containing functional groups equivalent to the hydroxyl groups in their ability to react with carboxyl groups. Thus, the glycol may be employed in the form of an epoxide, or an ester of the glycol with acetic acid or other lower aliphatic acid may be used.

In a convenient method for preparing the glycol dicarboxylate polyester, the dimethyl ester of the dicarboxylic acid is reacted with an excess of the glycol, preferably employing about 1.5 to 2.1 mols of the glycol per mol of the ester. A typical example is the reaction of ethylene glycol with dimethyl terephthalate. The reaction is usually carried out at atmospheric pressure, but higher or lower pressures may be used if desired. Following the ester interchange reaction, in which methanol is removed as a by-product, heating is continued under reduced pressure until the excess glycol is removed and the polycondensation reaction has proceeded to the desired degree. Normally, the reaction is continued until at least a trimer is produced, corresponding approximately to an inherent viscosity of about 0.1. If desired, however, polycondensation may be continued until a degree of polymerization of 200 or even higher is achieved, corresponding to an inherent viscosity of approximately unity. Small amounts of catalysts are usually added to facilitate the reaction, manganous acetate, calcium acetate, and sodium methoxide being typical ester interchange catalysts and antimony trioxide and zinc acetate being suitable polycondensation catalysts. Litharge, sodium hydrogen hexabutoxytitanate, and the tetra-alkyl titanates, such as tetra-isopropyl titanate, are examples of catalysts which may be used for both the ester interchange and polycondensation steps.

In a separate reaction, a terephthalic or isophthalic acid having substituents ortho to each carboxyl group, or an ester-forming derivative thereof, is reacted with a glycol or ester-forming derivative thereof. As a typical example, dimethyl 2,5-dimethylterephthalate is reacted with ethylene glycol. The reaction mixture is heated to carry out the ester interchange reaction, following which the pressure is reduced and the temperature increased to bring about polycondensation. Sodium hydrogen hexabutoxytitanate or the titanate esters, e.g., tetraisopropyl titanate or tetrabutyl titanate, are preferred catalysts for polycondensations involving the disubstituted terephthalates. The polycondensation reaction is continued until at least a trimer is formed, corresponding approximately to an inherent viscosity of at least about 0.1. Generally, the reaction is continued until a somewhat higher level is achieved, up to a degree of polymerization of 200 or even somewhat higher as in the case of the preparation of the glycol dicarboxylate polyester described above.

To melt blend the glycol dicarboxylate and the glycol ortho-substituted terephthalate or isophthalate polyesters so prepared, the dried ground polymer flake of the two polyesters in the desired proportion can be mixed followed by melting of the flake mixture under an inert atmosphere and stirring to form a homogeneous melt. The molten polyesters may also be mixed directly with the vigorous stirring. After at least about 10 minutes, in the melt, preferably at least about 30 minutes, the desired segmented copolyester is formed. If the molecular weight of the segmented copolyester is lower than desired, e.g., as the result of employing low molecular weight starting material segments, additional polycondensation can be carried out. To achieve a higher degree of polymerization, the melt blend segmented product is preferably solidified and ground to flake, following which the flake is heated below its melting point in a stream of inert gas to achieve solid phase polycondensation.

The segmented copolyesters of the invention are stable for several hours in the melt, especially at temperatures up to 280° C., and are thus highly suitable for processing in the melt without undergoing randomization within the time period normally required for extruding the molten polymer to form filaments or film.

The segmented copolyesters, as a class, are also relatively stable to alkaline hydrolysis. The tensile properties, crystallinity, and resistance to dry cleaning solvents of fibers prepared from the novel segmented copolyesters are generally comparable to the corresponding glycol dicarboxylate homopolyester; however, the dieability of the fiber is greatly improved with respect to the corresponding glycol dicarboxylate homopolyester.

Suitable examples of orth-substituted terephthalic or isophthalic acids which may be employed in accordance with the present invention include 2,5-dimethylterephthalic acid, 2,5-diethylterephthalic acid, 2,5-dibutylterephthalic acid, 2,5-dihexylterephthalic acid, 2,5-dioctylterephthalic acid, 2,5- dibenzylterephthalic acid, 2,5-diphenylterephthalic acid, 2,5-dichloroterephthalic acid, 2,5-dibromoterephthalic acid, 3,4-dimethylterephthalic acid, 2-methylisophthalic acid, and 4,6-dimethylisophthalic acid.

The following examples will serve to illustrate the preparation and properties of the novel segmented copolyesters of the invention; although the examples are not intended to be limitative.

The term "inherent viscosity," as used herein, is defined as the polymer property determined in accordance with the following relationship:

$$\eta_{inh} = \frac{\ln \eta_{rel}}{c}$$

wherein the relative viscosity, $\eta_{rel}$, is calculated by dividing the flow time in a capillary viscometer of a dilute solution of the polymer by the flow time for the pure solvent. The concentration ($c$) used in the examples is 0.25 g. of polymer per 100 ml. of solution, and the measurements are made at 25° C. The solvent employed in the examples comprises a mixture of 75% methylene chloride and 25% trifluoroacetic acid by volume.

As used herein, the "polymer-melt temperature," abbreviated "PMT," is defined as that temperature where a polymer sample becomes molten and leaves a trail when moved across a hot metal surface with moderate pressure. Practical considerations in PMT determinations are discussed by Sorenson and Campbell in "Preparative Methods of Polymer Chemistry," Interscience Publishers, Inc., N.Y., pages 49–50 (1961).

*Example 1.—Segmented copolyester of polyethylene terephthalate (80%) and polyethylene 2,5-dimethylterephthalate (20%)*

A. *Preparation of polyethylene terephthalate.*—A mixture of 4540 g. of dimethyl terephthalate (23.2 mols) and 3064 g. of ethylene glycol (49.4 mols) is heated in the presence of 13.6 g. of antimony trioxide and 20.4 g. of manganous acetate 4.5H₂O. Evolution of methanol commences at 160° C. Heating is continued for 2 hours, at which time evolution of methanol ceases, the final temperature being 230° C. Polycondensation is then carried out over a temperature range of 266° to 283° C. during a period of 3 hours while the pressure is reduced to 1.8 mm. of mercury. To ensure an inert atmosphere, a slow stream of nitrogen is passed into the reaction mixture during the polycondensation. The polyethylene terephthalate product has an inherent viscosity of 0.74 and a PMT of 255° C.

B. *Preparation of polyethylene 2,5-dimethylterephthalate.*—Forty-four g. of dimethyl 2,5-dimethylterephthalate (0.198 mol) is mixed with 37 g. (0.596 mol) of ethylene glycol in the presence of 0.1 g. of tetrabutyl titanate in 2 ml. of butanol. The mixture is heated at 180°–190° C. for 3 hours with evolution of methanol. The pressure is then reduced to 0.6 mm. of mercury while the temperature is increased to 280° C., following which polycondensation is carried out for 6.5 hours at this temperature and pressure. The product, polyethylene 2,5-dimethylterephthalate, has an inherent viscosity of 0.34 and a PMT of 92° C.

C. *Preparation of the segmented copolyester.*—Forty g. of finely-divided polyethylene terephthalate is mixed with 10 g. of polyethylene 2,5-dimethylterephthalate in a 150-ml. round bottom flask fitted with a glass stirrer and a nitrogen inlet. The flask is blanketed with nitrogen and heated to 280° C. After a few minutes of heating and stirring at this temperature, a homogeneous melt is obtained. Heating and stirring is continued for a total of 45 minutes, after which the segmented copolyester product is cooled. It has a PMT of 236° C. and an inherent viscosity of 0.55. When a sample of the segmented copolyester is melted and maintained at a temperature of 280° C. for one hour, its PMT upon resolidification is virtually unchanged, an indication of the good stability of the block copolyester.

D. *Additional polycondensation of the segmented copolyester by solid phase polymerization.*—A sample of the copolyester prepared as described above is pulverized and heated at 200° C. and 0.5 mm. of mercury for 17 hours with a continuous slow stream of nitrogen gas passed through the powder from a capillary. The product has an inherent viscosity of 0.74.

E. *Filaments and films of the segmented copolyester.*—A molten sample of the segmented copolyester prepared as described in Part D above is extruded at 265° C. to form a filament, using conventional techniques. The filament is oriented by drawing it around a pin maintained at 102° C. at a draw ratio of 4.8×. The drawn filament has a tenacity of 2.6 g.p.d., an elongation of 51%, and an initial modulus of 51 g.p.d. The filament exhibits good dyeability with 1,4-diamino-2,3-dichloroanthraquinone, a violet disperse dye. The rate of dyeing is 3.3 times the rate observed with oriented filaments of unmodified polyethylene terephthalate.

A film melt pressed from the segmented copolyester product, when boiled in 1% aqueous sodium hydroxide solution for one hour, exhibits a weight loss of only 0.4%, as contrasted with a 1% weight loss suffered by a film of unmodified polyethylene terephthalate.

*Example 2.—Segmented copolyester of polyethylene terephthalate (80%) and poly(p-hexahydroxylylene 2,5-dimethylterephthalate) (20%)*

A mixture of 17.6 g. of dimethyl 2,5-dimethylterephthalate (0.079 mol), 28.8 g. of p-hexahydroxylylene glycol (0.203 mol), and a solution of 0.140 g. of sodium hydrogen hexabutoxytitanate, $NaHTi(OBu)_6$, in 1 ml. of butanol is heated at 180–200° for 2.5 hours with evolution of methanol. The pressure is then reduced to 0.3 mm. of mercury while the temperature is increased to 270° C., following which polycondensation is carried out for 3.75 hours at this temperature and pressure. The product, poly(p-hexahydroxylylene 2,5-dimethylterephthalate), has an inherent viscosity of 0.48 and a PMT of 120° C. It is a crystalline polymer as indicated by X-ray diffraction patterns.

A segmented copolyester is prepared in the manner of Part C of Example 1, employing 40 g. of polyethylene terephthalate and 10 g. of poly(p-hexahydroxylylene 2,5-dimethylterephthalate), stirred together at 280° C. for 45 minutes. It has an inherent viscosity of 0.54 and a PMT of 237° C.

*Example 3.—Segmented copolyester of polyethylene terephthalate (80%) and polytetramethylene 2,5-dimethylterephthalate (20%)*

A mixture of 22.2 g. of dimethyl 2,5-dimethylterephthalate (0.10 mol), 27 g. of tetramethylene glycol (0.30 mol), and a solution of 0.140 g. of $NaHTi(OBu)_6$ in 1 ml. of butanol is heated at 160–190° for 3 hours with evolution of methanol. The pressure is then reduced to 0.3 mm. of mercury while the temperature is increased to 260° C., following which polycondensation is carried out for 3.5 hours at this temperature and pressure. The product, polytetramethylene 2,5-dimethylterephthalate, has an inherent viscosity of 0.68 and a PMT of 193° C. It is a crystalline polymer as indicated by X-ray diffraction patterns.

A segmented copolyester is prepared in the manner of Part C of Example 1, employing 40 g. of polyethylene terephthalate and 10 g. of polytetramethylene 2,5-dimethylterephthalate stirred together at 280° C. for 45 minutes. It has an inherent viscosity of 0.55 and a PMT of 235° C.

*Example 4.—Segmented copolyester of polyethylene terephthalate (80%) and polyethylene 2,5-diphenylterephthalate (20%)*

A mixture of 40.6 g. of bis(2-hydroxyethyl) 2,5-diphenylterephthalate (0.10 mol) and a solution of 0.15 g. of tetrabutyl titanate in 3 ml. of butanol is heated at 280° C. under a pressure of 0.3 mm. of mercury for 4.5 hours. The product, polyethylene 2,5-diphenylterephthalate, has an inherent viscosity of 0.33 and a PMT of 137° C.

A segmented copolyester is prepared in the manner of Part C of Example 1, employing 40 g. of polyethylene terephthalate and 10 g. of polyethylene 2,5-diphenylterephthalate stirred together at 280° C. for 40 minutes. It has an inherent viscosity of 0.55 and a PMT of 234° C. The segmented copolyester is then pulverized and subjected to solid phase polymerization in the manner of Part D of Example 1 at 200° C. and 0.5 mm. of mercury for 17 hours with a continuous slow stream of nitrogen gas passed through the powder from a capillary. The product has an inherent viscosity of 0.76, the PMT remaining the same.

A molten sample of the segmented copolyester prepared by solid phase polymerization as described above is extruded at 277° C. to form a filament, which is subsequently oriented 4.8× by drawing it 4.8× around a draw pin maintained at 110° C. The drawn filament has a tenacity of 2.7 g.p.d., an elongation of 47%, and an initial modulus of 51 g.p.d. The filament exhibits good dyeability with 1,4-diamino-2,3-dichloroanthraquinone, a violet disperse dye. The rate of dyeing is 1.6 times the rate observed with oriented filaments of unmodified polyethylene terephthalate.

*Example 5.—Segmented copolyester of poly(bicyclohexyl-4,4'-dimethylene 4,4'-bibenzoate) (80%) and polyethylene 2,5-dimethylterephthalate (20%)*

A mixture of 54 g. of dimethyl 4,4'-bibenzoate (0.2 mol), 81.4 g. of bis(4-hydroxymethylcyclohexyl) (0.36 mol), and 0.64 g. of $NaHTi(OBu)_6$ in 4 ml. of butanol is heated for 1 hour with evolution of methanol. The pressure is reduced to 0.5 mm. while the temperature is increased to 300° C., following which polycondensation is carried out at this temperature and pressure for 2 hours and 45 minutes. The product, poly(bicyclohexyl-4,4'-dimethylene 4,4'-bibenzoate), has an inherent viscosity of 0.51 and a PMT of 285° C.

A segmented copolyester is prepared in the manner of Part C of Example 1, employing 40 g. of poly(bicyclohexyl-4,4'-dimethylene 4,4'-bibenzoate) and 10 g. of polyethylene 2,5-dimethylterephthalate stirred together at 280° C. for 45 minutes. It has an inherent viscosity of 0.47 and a PMT of 241° C.

*Example 6.—Segmented copolyesters of various polyesters with 20% of polytetramethylene 2,5-dimethylterephthalate*

A mixture of 5442 g. of dimethyl 2,6-naphthalenedicarboxylate (22.3 mols) and 3050 g. of ethylene glycol (49.1 mols) is heated at 160–235° C. for 2 hours in the presence of 2.1 g. of manganous acetate and 1.9 g. of antimony trioxide with evolution of methanol. The pressure is then reduced to 2 mm. of mercury and the temperature increased to 285° C., following which the polycondensation is carried out at this temperature and pressure for 4 hours. The product, polyethylene 2,6-naphthalenedicarboxylate, has an inherent viscosity of 0.6 and a PMT of 260° C. The polymer is pulverized and heated at 265° C. and 0.1 mm. of mercury for 12 hours while a slow stream of nitrogen is passed through the polymer. The inherent viscosity of the polymer after this solid phase polycondensation step is 0.75.

A segmented copolyester is prepared in the manner of Part C of Example 1, employing 26 g. of polyethylene 2,6-naphthalenedicarboxylate and 6.5 g. of polytetramethylene 2,5-dimethylterephthalate stirred together at 280° C. for 45 minutes. It has an inherent viscosity of 0.47 and a PMT of 237° C.

In a similar way, a series of additional segmented copolyesters are prepared by stirring 6.5 g. of polytetramethylene 2,5-dimethylterephthalate and 26 g. of each of the following polyesters at 280° C. for 45 minutes:

Poly(p-hexahydroxylylene terephthalate)

Poly(bicyclohexyl-4,4'-dimethylene 4,4'-sulfonyldibenzoate)
Poly(ethylene 2,8-dibenzofurandicarboxylate)
Poly(1,3-cyclopentanedimethylene 4,4'-bibenzoate)
Poly(bicyclohexyl-4,4'-dimethylene decahydro-2,6-naphthalenedicarboxylate)
Poly(ethylene 4,4'-carbonyldibenzoate)
Poly(ethylene chloroterephthalate)

*Example 7.—Segmented copolyester of polyethylene terephthalate (80%) and polytetramethylene 2,5-dichloroterephthalate (20%)*

A mixture of 26.3 g. of dimethyl 2,5-dichloroterephthalate (0.1 mol), 19.8 g. of tetramethylene glycol (0.22 mol), and 0.14 g. of NaHTi(OBu)$_6$ in 1 ml. of butanol is heated at 160–200° C. for 45 minutes with evolution of methanol. The pressure is then reduced to 0.6 mm. of mercury and the temperature is increased to 275° C., following which polycondensation is carried out at this temperature and pressure for 2 hours and 15 minutes. The product, polytetramethylene 2,5-dichloroterephthalate, is crystalline and has a PMT of 200° C.

A segmented copolyester is prepared in the manner of Part C of Example 1, employing 10 g. of polytetramethylene 2,5-dichloroterephthalate and 40 g. of polyethylene terephthalate stirred together at 280° C. for 45 minutes. It has an inherent viscosity of 0.4 and a PMT of 239° C.

*Example 8.—Segmented copolyester of polyethylene terephthalate (80%) and 20% of various polyesters of ortho-substituted terephthalic and isophthalic acids*

A mixture of 26.3 g. of dimethyl 2,5-dichloroterephthalate (0.1 mol), 13.6 g. of ethylene glycol (0.22 mol), and 0.05 g. of tetrabutyl titanate in 1 ml. of butanol is heated at 160–200° C. for 2 hours with evolution of methanol. The pressure is reduced to 2 mm. of mercury and the temperature increased to 250° C., following which polycondensation is continued at that temperature and pressure for 2 hours and 15 minutes. The product, polyethylene 2,5-dichloroterephthalate, has an inherent viscosity of 0.3 and a PMT of 95° C.

A segmented copolyester is prepared in the manner of Part C of Example 1, employing 40 g. of polyethylene terephthalate and 10 g. of polyethylene 2,5-dichloroterephthalate stirred together at 280° C. for 45 minutes. It has an inherent viscosity of 0.41 and a PMT of 236° C.

Similarly, 0.1 mol of each of the dimethyl esters listed in the table is reacted with 13.6 g. of ethylene glycol (0.22 mol) in the presence of 0.05 g. of tetrabutyl titanate to form the corresponding polyester listed in the table. Segmented copolyesters melting in the range 230°–250° C. are then prepared by stirring 40 g. quantities of polyethylene terephthalate with 10 g. quantities of each of the polyesters listed in the table at 280° C. for one hour.

TABLE.—PREPARATION OF ETHYLENE GLYCOL POLYESTERS OF ORTHO-SUBSTITUTED TEREPHTHALIC AND ISOPHTHALIC ACIDS

| Dimethyl Ester | Polyester Prepared from Ethylene Glycol and Dimethyl Ester |
|---|---|
| Dimethyl 2,5-dibromoterephthalate. | Polyethylene 2,5-dibromoterephthalate. |
| Dimethyl 2,3-dimethylterephthalate. | Polyethylene 2,3-dimethylterephthalate. |
| Dimethyl 2,5-dibenzylterephthalate. | Polyethylene 2,5-dibenzylterephthalate. |
| Dimethyl 2-methylisophthalate. | Polyethylene 2-methylisophthalate. |
| Dimethyl 4,6-dimethylisophthalate. | Polyethylene 4,6-dimethylisophthalate. |

Since many different embodiments of the invention may be made without departing from the spirit and scope thereof, it is to be understood that the invention is not limited by the specific illustrations except to the extent defined in the following claims.

I claim:

1. A segmented linear copolyester having an inherent viscosity of at least 0.3, as determined at 25° C. for a solution of 0.25 g. of the copolyester dissolved in a mixture of 75 milliliters of methylene chloride and 25 milliliters of trifluoroacetic acid, and characterized by alternating first and second polyester segments connected through ester linkages, the first polyester segment consisting essentially of a succession of 3 to about 200 recurring structural units of ethylene terephthalate, and the second polyester segment consisting essentially of a succession of 3 to about 200 recurring structural units of a glycol ester of a dicarboxylic acid represented by the formula

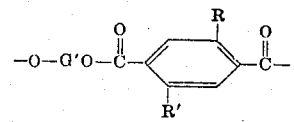

wherein G' is a divalent saturated hydrocarbon radical, selected from the group consisting of ethylene and tetramethylene, and R and R' are hydrocarbon radicals of 1 to 8 carbon atoms and are free from aliphatic unsaturation, the weight ratio of said first polyester segment to said second polyester segment being in the range from 60/40 to 95/5.

2. A segmented copolyester as defined in claim 1 wherein said first polyester segments are polyethylene terephthalate and said second polyester segments are polyethylene 2,5-dimethylterephthalate.

3. A segmented copolyester as defined in claim 1 wherein said first polyester segments are polyethylene terephthalate and said second polyester segments are polytetramethylene 2,5-dimethylterephthalate.

4. A segmented copolyester as defined in claim 1 wherein said first polyester segments are polyethylene terephthalate and said second polyester segments are polyethylene 2,5-diphenylterephthalate.

5. Filaments of the segmented copolyester defined in claim 1.

6. Films of the segmented copolyester defined in claim 1.

References Cited by the Examiner

UNITED STATES PATENTS

| 3,037,964 | 6/1962 | Bruson et al. | 260—75 |
| 3,117,107 | 1/1964 | Stimpson et al. | 260—75 |
| 3,117,950 | 1/1964 | Kibler et al. | 260—860 |
| 3,123,587 | 3/1964 | Hogsed | 260—75 |

FOREIGN PATENTS

| 1,303,888 | 8/1962 | France. |
| 885,492 | 12/1961 | Great Britain. |

MURRAY TILLMAN, *Primary Examiner.*

J. T. GOOLKASIAN, *Assistant Examiner.*